Figure 9:
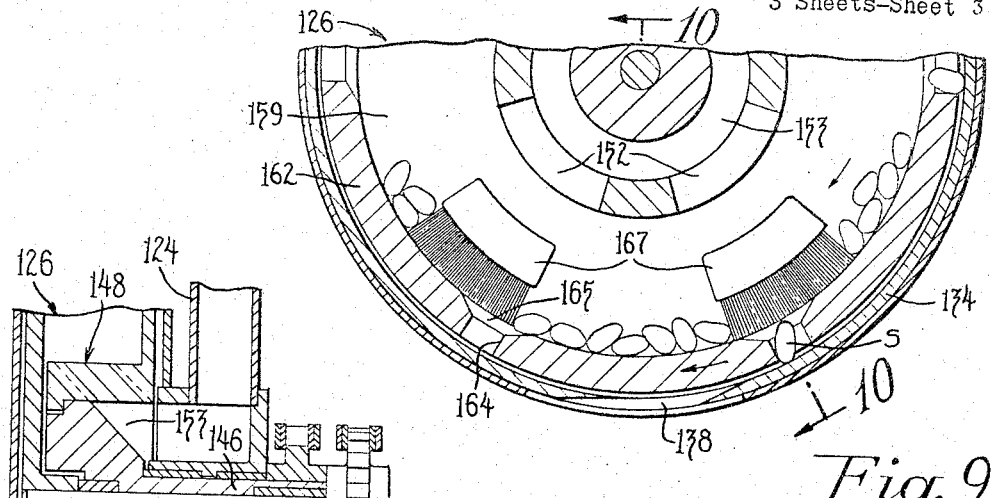

Oct. 17, 1967  J. E. MORRISON, JR., ET AL  3,347,426
PRECISION SEED PLANTER
Filed June 15, 1965  3 Sheets-Sheet 1
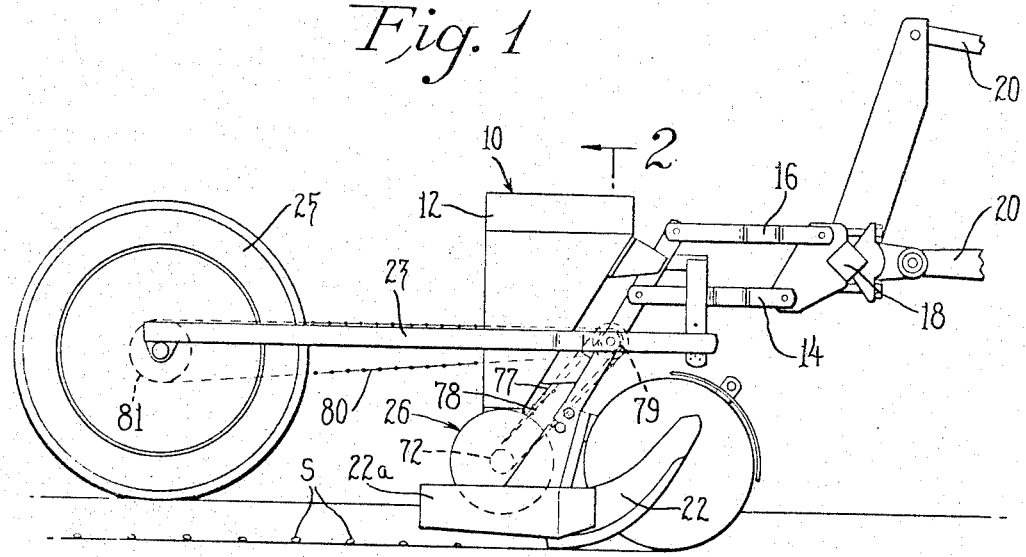
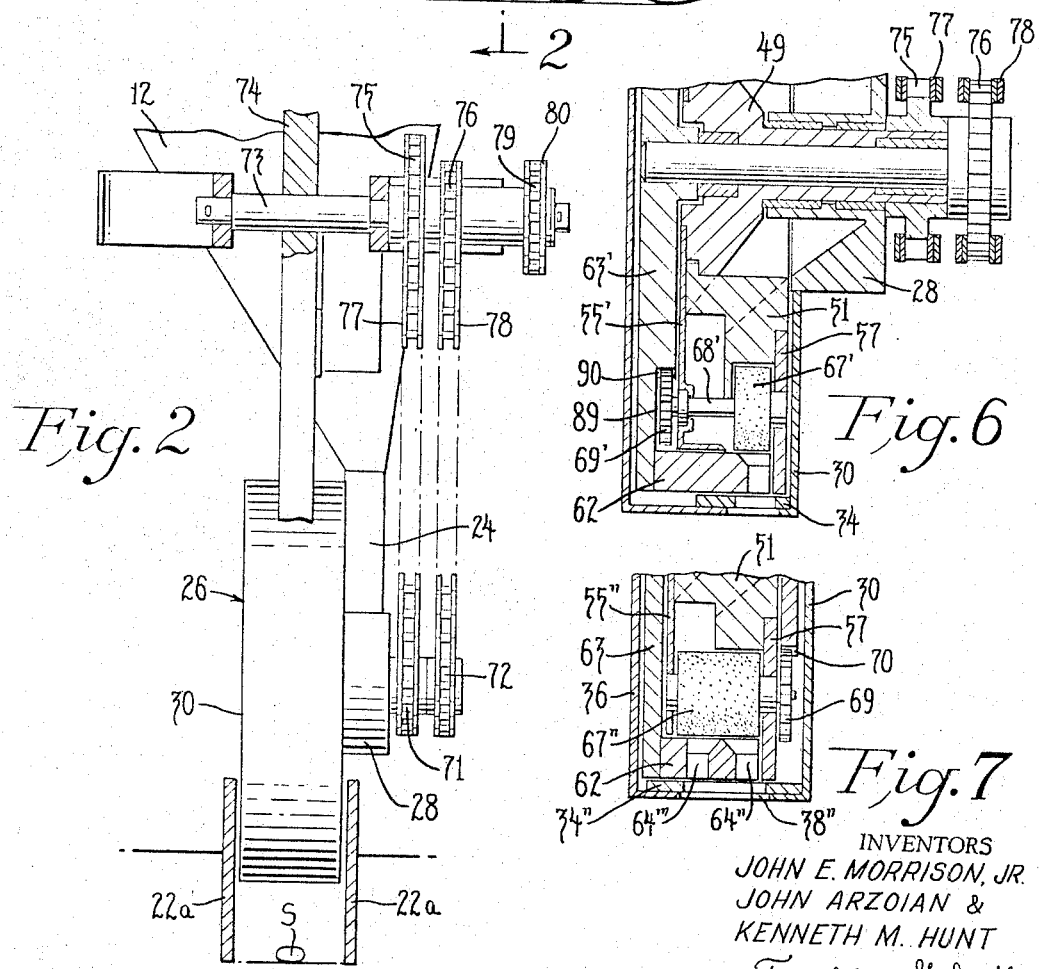
INVENTORS
JOHN E. MORRISON, JR.
JOHN ARZOIAN &
KENNETH M. HUNT
Tweedale & Gerhardt
ATTORNEYS

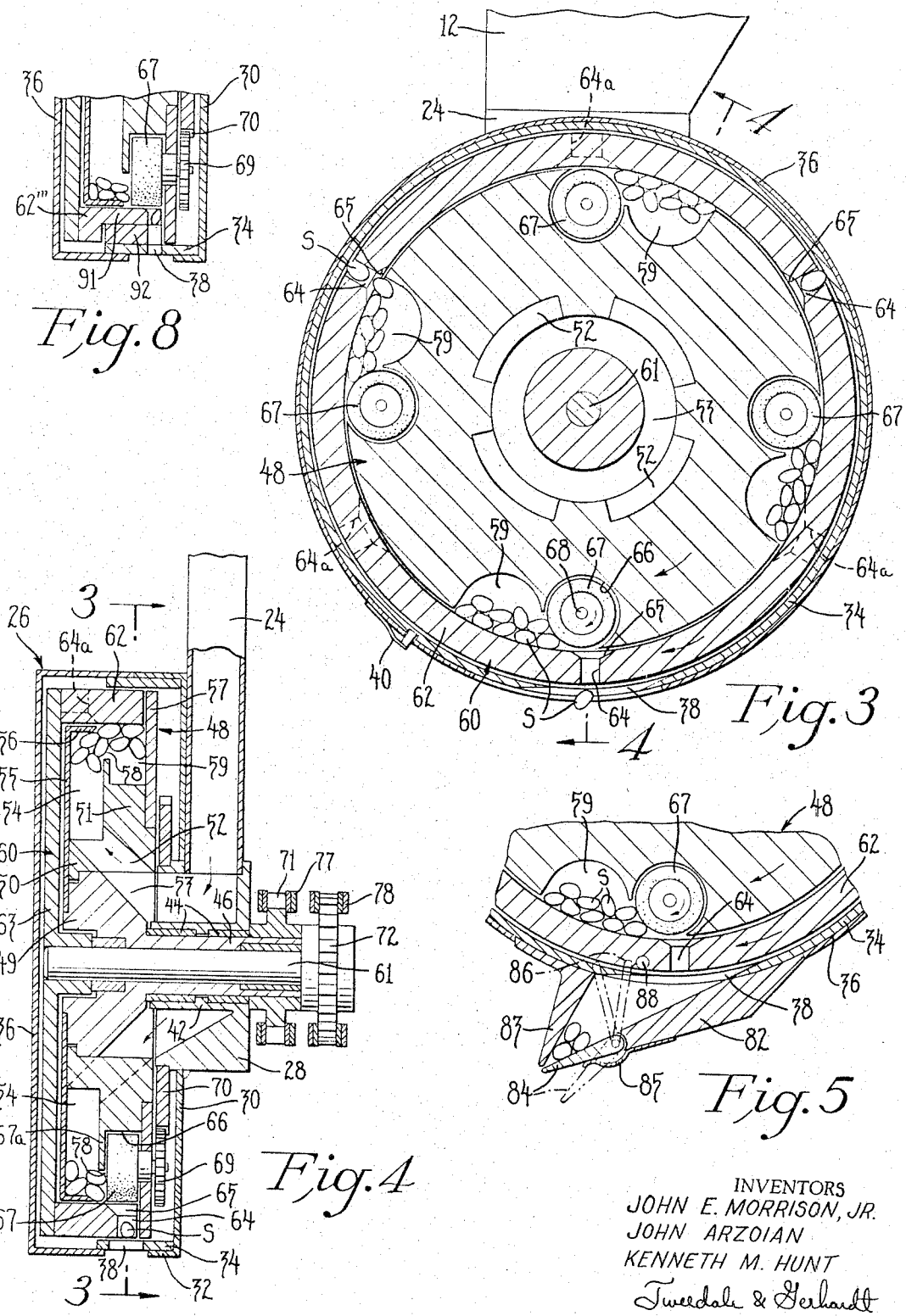

Oct. 17, 1967   J. E. MORRISON, JR., ET AL   3,347,426
PRECISION SEED PLANTER
Filed June 15, 1965   3 Sheets-Sheet 3

INVENTORS
JOHN E. MORRISON, JR.
JOHN ARZOIAN &
KENNETH M. HUNT

Tweedale & Gerhardt
ATTORNEYS.

United States Patent Office 3,347,426
Patented Oct. 17, 1967

3,347,426
PRECISION SEED PLANTER
John E. Morrison, Jr., Royal Oak, and John Arzoian and Kenneth M. Hunt, Dearborn, Mich., assignors to Massey-Ferguson Inc., Detroit, Mich.
Filed June 15, 1965, Ser. No. 464,117
20 Claims. (Cl. 222—352)

This invention relates generally to planters and more particularly with mechanism for accurately planting seeds at regularly spaced intervals.

The present invention is concerned with planting seeds with precision to reduce the amount of cost, time and labor involved in the planting operation as well as in subsequent cultivating and harvesting operations. Generally, in order to assure an adequate crop, an excessive number of seeds are planted necessitating the employment of costly and time consuming labor to thin the plants after emergence of the seedlings to obtain proper spacing between the plants. Furthermore, the remaining plants are frequently not in straight rows making machine harvesting more difficult.

It is therefore an object of this invention to provide a precision seed planting mechanism that will operate at substantially higher speeds than presently available planters to accurately plant seeds at regularly spaced intervals in a straight row to eliminate the necessity for plant thinning and the planting of excessive seeds.

A further object is to provide a precision seed planter that will deposit seeds onto the ground individually or in groups of a selected number of seeds at accurately spaced intervals.

Still another object is to provide seed planting mechanism including a rotating seed plate having individual seed cells in which the seeds are transferred from an at rest position within a container and moved in a path contiguous with that of the seed cells so that the seed cells may pick up the seeds individually with a minimum amount of impact and eject them from the planter at regularly spaced intervals.

Still another object is to provide a precision seed planter having a rotating metering member with individual seed cells in which the seeds are accelerated from an at rest position into a path in which the seeds move in the same direction as the seed cells with a minimum amount of differential velocity and are individually transferred to the seed cells by centrifugal force with a minimum amount of impact, the seed cells thereafter carrying the seeds to a release point where they are ejected centrifugally from the planting mechanism onto the ground.

In accordance with the present invention, a rotatable accelerator picks up seeds from a supply and carries the seeds centrifugally to chambers formed in the accelerator near its periphery. The outer wall of the chambers are open such that the centrifugal force tends to urge the seeds radially from the chambers. Concentrically enclosing the accelerator member is an annular seed plate which overlies the open side of the accelerator chambers to confine the seeds within the chambers. A plurality of seed cells are formed in the seed plate and the seed plate and accelerator are driven at differential speeds in the same direction such that the seed cells communicate at intervals with the open chambers, the centrifugal force urging one of the seeds into the seed cell which carries it to a release point where the seed is ejected onto the ground.

Figure 10:
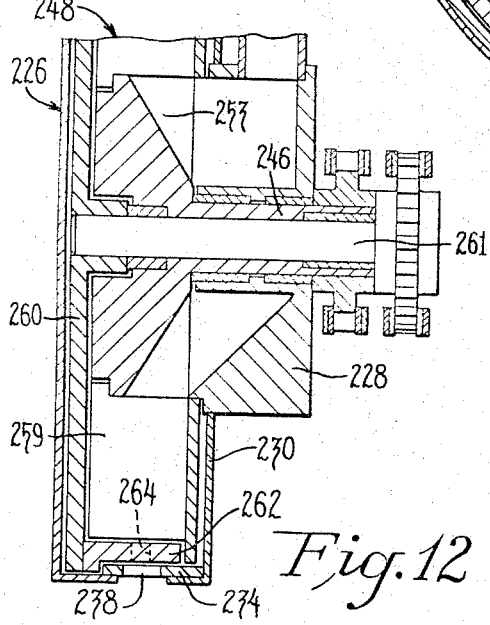
Figure 11:
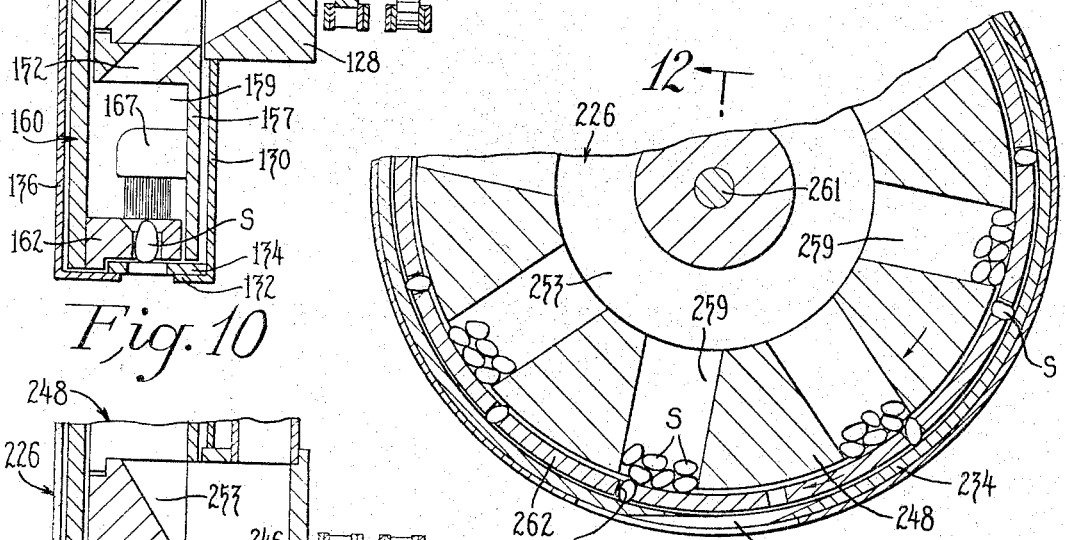
Figure 12:
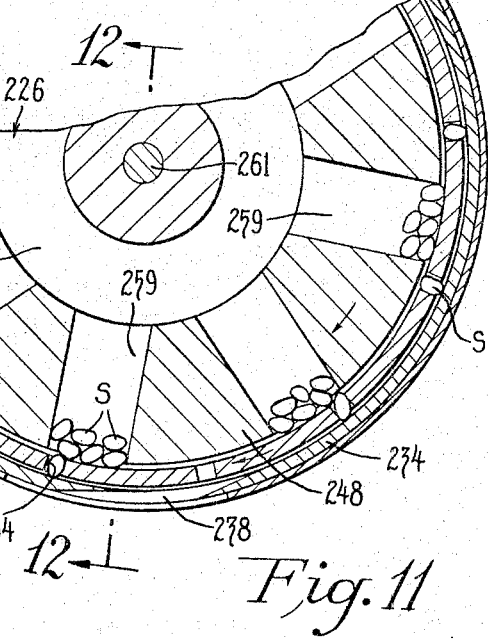

Other objects, advantages and features of the invention will become apparent from the following description taken in connection with the accompanying drawings in which:

FIG. 1 is a side elevation of a seed planter having precison planting mechanism embodying the invention;
FIG. 2 is a view taken on line 2—2 of FIG. 1;
FIG. 3 is a sectional view of a preferred embodiment of the planting mechanism;
FIG. 4 is a sectional view taken on line 4—4 of FIG. 3;
FIG. 5 is a sectional detail view illustrating a hill drop attachment;
FIG. 6 is a sectional detail view illustrating a modification of the embodiment of FIGS. 3 and 4;
FIG. 7 is a sectional detail view of still another modification of the embodiment of FIGS. 3 and 4;
FIG. 8 is a sectional detail view illustrating the embodiment of FIGS. 3 and 4 adapted for small seeds;
FIG. 9 is a partial sectional view of a second embodiment of the invention;
FIG. 10 is a sectional view taken on line 10—10 of FIG. 9;
FIG. 11 is a partial sectional view of a third embodiment of the invention; and
FIG. 12 is a sectional view taken on line 12—12 of FIG. 11.

While the invention will be described in connection with specific embodiments, it will be understood that the invention is not limited to the exact construction illustrated. One the contrary, all alternatives, modifications and equivalents as may be included within the spirit and scope of the invention are intended to be covered herein.

In FIG. 1, a planter is designated collectively by reference numeral 10 and includes a seed hopper 12 supported on link members 14 and 16 which are secured to a tool bar 18. Tool bar 18 in turn is connected with the rear draft links 20 of a tractor (not shown). Disposed beneath hopper 12 in engagement with the ground is a seed drill 22 of conventional construction having diverging blades 22a (FIG. 2) between which seeds s are deposited as the drill opens a furrow and advances along the ground. Connected with link member 16 by a drawbar 23 is a press wheel 25 which closes the furrow over the seeds.

Secured to the lower end of the outlet 24 of hopper 12 is a fitting 28 on which is supported a seed dispensing assembly designated collectively by reference numeral 26.

With reference to the preferred embodiment shown in FIGS. 3 and 4, the seed dispensing assembly 26 includes a housing 30 having a cylindrical wall 32 which receives a cylindrical spacer member 34. The cylindrical spacer member 34 may be frictionally engaged with wall 32 of housing 30 or may be bolted or secured to the housing in any conventional manner. Mounted on spacer 34 coaxially with the cylindrical wall 32 is a cover member 36 which encloses the seed metering and dispensing mechanism of the invention. Cover member 36 may be secured to spacer 34 by a spring latch 40 (FIG. 3) of conventional construction. Formed in the cylindrical wall of housing 30 and cover 36 as well as in spacer member 34 is a seed release opening 38 as shown in FIGS. 3 and 4.

Fitting 28 is formed with a cylindrical hub 42 in which is mounted a pair of axially spaced cylindrical bearings 44 which rotatably support the shaft 46 of an accelerator member 48. The accelerator member 48 is made up of a central, outwardly flared portion 49 which concentrically receives a cylindrical portion 50 having a radial flange 51. The outwardly flared central portion 49 cooperates with the inner diameter of cylindrical portion 50 to define an annular inlet opening 53 which communicates with the hopper outlet through the inner cavity of fitting 28. Secured to the left surface of portions 49 and 50 as viewed in FIG. 4, is a plate member 55 having a cylindrical flange 56 at its periphery. Plate 55 cooperates with the radial flange 51 of member 50 to define a radial passage 54 which communicates with inlet opening 53 through a passage 52 formed in member 50. Mounted on the opposite surface of the cylindrical member 50 from plate member 55 is an annular plate 57 which extends radially beyond flange 51.

Flange 51 is formed with a plurality of peripheral, open sided chambers 59 which communicate with passages 54 through an opening 58. As shown in FIG. 3, four such chambers 59 are formed in the illustrated embodiment, each of which are open on the peripheral side of flange 51.

Rotatably mounted in the hollow shaft 46 of accelerator 48 is the shaft 61 of a metering member 60. Metering member 60 includes a circular disc 63 having an annular seed plate 62 secured to its periphery and projecting toward the right in FIG. 4 to close the open side of chambers 59. It is apparent that seeds from the hopper outlet 24 will be centrifugally carried to chambers 59 upon rotation of the accelerator member 48, and the seeds will thereafter be carried around the axis of shaft 46 in a circular path defined by the inner periphery of the seed plate 62.

Formed in the seed plate 62 is a plurality of seed carrying elements or cells in the form of radial openings 64, three such openings 64 being shown in the embodiment illustrated in FIG. 3. The inlet ends of openings 64 are each surrounded by an entrance recess or depression 65. When the open side of one of the chambers 59 communicates with the inlet of one of the seed cells 64, seeds in chamber 59 will be centrifugally urged to enter the opening 64. With a seed received in the seed cell 64, rotation of the metering member 60 will urge the seed within the seed cell radially toward the inner periphery of retaining ring 34. When the seed cell 64 passes the release opening 64. With a seed received in the seed cell 64, rotation cell as indicated in FIG. 3.

Formed in flange 51 adjacent each of the chambers 59 is a recess 66 in which is received a clearance wheel 67 mounted on a shaft 68 journalled in plate 57. Fixed to the end of shaft 68 opposite wheel 67 is a gear 69 engaged with a fixed sun gear 70 mounted on the fitting 28. Consequently, upon rotation of accelerator member 48 in a clockwise direction as viewed in FIG. 3, wheels 67 will rotate about the axes of their respective shafts 68 in a clockwise direction. The peripheral rim of wheels 67 may be formed of rubber, polyurethane, wire or nylon bristles, or other material. As the rotating wheels 68 move past the inlet of the seed carrying cells 64, any seeds seated in the entrance recess 65 are swept by the wheels back into chamber 59 so that only one seed can pass through the seed cell 64. Wheels 67 thus clear the entrance recesses 65 as the trailing end of chamber 59 moves past the seed cell. With reference to FIGS. 1, 2 and 4, sprockets 71 and 72 are fixed to shafts 46 and 61 for respectively driving the accelerator and metering member. Rotatably supported on a frame member 74 of the planter is a shaft 73 for a pair of sprockets 75 and 76. Sprockets 75 and 76 are connected with sprockets 71 and 72 by chains 77 and 78, respectively. Shaft 73 is driven by a sprocket 79 connected through a chain 80 with a sprocket 81 mounted on the shaft of press wheel 25. Thus, the metering member and accelerator member are driven in accordance with the ground speed as determined by press wheel 25.

In operation, seeds from the hopper outlet 24 pass through the internal cavity of fitting 28 into inlet opening 53 of accelerator member 48. Rotation of accelerator member 48 causes the seeds to be moved centrifugally through passages 52 and 54 to chamber 59 where they are then carried in a circular path about the inner periphery of seed plate 62. Metering member 60 is rotated in the same direction as accelerator member 48 by chains 78 but preferably at a slower speed such that the chambers 59 move past the seed cells 64 during each revolution of the accelerator and metering members. The ratio of the speed of accelerator member 48 with respect to that of the seed cells is preferably in the order of one and a half to one.

As each chamber 59 comes into communication with the entrance recess 65 of a seed cell 64, the centrifugal force acting on the seeds causes one of the seeds to move radially outwardly into the seed cell. The seed cells are large enough to receive only one seed. Subsequently, the clearance wheel 67 passes the inlet side of seed cell 64 and sweeps any additional seeds out of the entrance recess back into chamber 59. The centrifugal force due to the rotation of the seed plate 62 urges the seed within the seed cell in a radial direction toward the inner surface of retaining ring 34 and, when the seed cell moves into communication with the release opening 38, the seed is ejected centrifugally from the assembly. Preferably, the sprocket sizes are such that the tangential velocity of the seed as it leaves the release opening 38 is equal in magnitude to the ground speed of the planter but in the opposite direction so that the seed has zero horizontal velocity relative to the ground.

Since the seed cell 64 and the seeds within chambers 59 move in contiguous paths and in the same direction, the impact between the seeds and the seed cells 64 is reduced to a minimum to substantially eliminate the possibility of the seeds rebounding into the chamber 59 upon striking the edge of opening 64 and missing the seed cell. The wall 67a (FIG. 4) separating chamber 59 and recess 66 from passage 54 prevents an excessive number of seeds from entering the chamber 59 which would tend to jam the seeds within the chamber. The size and configuration of the wall of recess 66 with respect to wheels 67 is such that the seeds cannot be jammed between the wheel 67 and the recess wall. The spacing of the seeds in the furrow (FIG. 1) can be varied by changing the sizes of sprockets 80 and 81.

Axially offset from seed cells 64 is a second set of seed cells 64a for accommodating larger seed. As shown in FIG. 4, when seed cells 64 are used, seed cells 64a are shut off from communication with chamber 59 by flange 55 or plate 55. In order to adapt the assembly for the larger seeds afforded by seed cells 64a, cover 36 is removed and metering member 60 can be axially separated from shaft 61. The cylindrical seed plate 62 is disconnected from plate 63 and reversed, and the metering member is then reassembled onto shaft 61. Thus, by merely reversing the seed plate 62, different size seeds may be planted.

FIG. 5 illustrates a hill drop attachment wherein a plate 82 is secured to the periphery of housing 30 beneath the seed release opening 38. On the opposite side of seed release opening 38 is a bracket 83 having a depending wall which cooperates with a hinge member 84 on plate 82 to provide a recess or trough for accumulating seeds deposited through release opening 38. Hinge member 84 is biased to its closed position by a spring member 85 mounted on the lower surface of plate 82. Hinge member 84 is actuated against spring 85 by a lever 86 fixed to the hinge pin which is actuated by a pin 88 carried by the seed plate 62. Pin 88 strikes lever 86 after each revolution of the seed plate 62 to open hinge 84 and release the accumulated seeds to the ground. In the embodiment of FIG. 3, the seed plate 62 has three seed cells 64 and thus, with each revolution, three seeds are deposited on hinge 84.

FIG. 6 illustrates a modified arrangement of the embodiment of FIGS. 3 and 4 wherein the fixed sun gear 70 of FIGS. 3 and 4 is omitted and a clearance wheel 67' is journalled for rotation in plate 55' and plate 57. Fixed to the end of shaft 68' on the opposite side of plate 55' of the accelerator member is a gear 69' which is received in an annular recess 89 formed in plate 63' of the metering member. Gear teeth 90 are formed on the shoulder defined by the annular recess 89 and are engaged with gears 69' so that the clearance wheel 67' is driven in accordance with the differential velocity between metering member 60 and the accelerator member 48.

FIG. 7 shows still another modification of the embodiment of FIGS. 3 and 4 wherein pairs of seed cells 64' are provided side-by-side in the seed plate 62'' for depositing the seeds in pairs. The clearance wheel 67'' is increased in axial length to provide the clearing action for both of the seed cells.

In FIG. 8, the planter is adapted for dispensing very small seeds. The seed plate 62''' has a reduced portion 91 and an annular spacer 92 is received between the retaining ring 34 and the reduced portion 91 of the seed selector.

FIGS. 9 and 10 illustrate a second embodiment of the invention wherein the shaft 146 of an accelerator member 148 is supported rotatably in a fitting 128. The seed dispensing assembly 126 includes a metering member 160 having a shaft 161 rotatably supported within the hollow shaft 146. Accelerator member 148 is formed with a radial flange 157 which, together with metering member 160, defines an annular chamber 159 open at its outer periphery and communicating with the inlet opening 153 of the accelerator member through passages 152. Metering member 160 has secured to its periphery a cylindrical seed plate 162 having seed cells 164 in the form of radial openings with their inlet ends communicating with entrance recesses 165. Seed plate 162 encloses the open periphery of chamber 159.

Mounted on the inner wall 157 of chamber 159 is a plurality of clearance brushes 167 for sweeping excess seeds out of the recesses 165 to prevent more than one seed from entering the seed cells 164. The remaining structure and operation of the embodiment of FIGS. 9 and 10 is similar to that of the previously described embodiment.

FIGS. 11 and 12 illustrate still another embodiment of the invention wherein a seed dispensing assembly 226 includes an accelerator member 248 having an inlet opening 253 connected with a plurality of radial chambers 259 open at their outer ends opposite inlet opening 253. The chambers 259 are normally closed by an annular seed plate 262 having a plurality of radial seed cells 264 formed therein. As the chambers 259 rotate in a clockwise direction past the seed cells 264, the seeds within chambers 259 are urged by centrifugal force toward the seed cells and one of the seeds is received in the seed cells 264 and carried to the release opening 238 where it is ejected onto the ground. FIGS. 11 and 12 illustrate a simplified embodiment of the invention and the clearance wheels and brushes of the embodiments of FIGS. 3 and 9, respectively, are omitted.

In the embodiment of FIGS. 11 and 12 the seeds are moved past the seed cells 264 by the right hand trailing edges or walls of chambers 259 as viewed in FIG. 11 and the entrance recesses 65 and 165 are omitted. Thus, the seeds s are transferred into the seed cells 264 solely by centrifugal force. By rotating the accelerator in the same direction as the seed plate 262 to maintain a minimum differential velocity between the seeds in chambers 259 and seed cells 264, the impact between the seeds and seed cells is reduced and will not overcome the centrifugal force acting on the seeds and tending to move the seeds into the cells.

In the embodiments of FIGS. 3 and 9, the entrance recesses 65 and 165 formed in the inner peripheries of the seed plates 62 and 162, respectively, guide the seeds toward the seed cell inlet. The most desirable configuration of the entrance recesses is dependent upon the size and shape of the particular seeds to be planted. Consequently, in the embodiment of FIG. 3, the entrance recesses 65 for seed cells 64 may be of different configuration than those for seed cells 64. In both cases, as the leading wall of chambers 59 (the left hand wall as viewed in FIG. 3) pass over the entrance recess, a seed is guided toward the inlet of the seed cell and centrifugally urged into the cell. As the trailing edge or wall of chamber 59 (the right hand wall adjacent wheel 67 in FIG. 3) moves over the entrance recess, the wheels 67 deflect seeds from the recess away from the seed cell into the chamber 59 so that with one seed in the cell, others cannot become jammed in the seed cell and damaged by the accelerator as the trailing wall of chamber 259 passes. As pointed out above, the wall 67a extends across the side of chamber 59 and prevents an excessive number of seeds from entering chamber 59 and becoming jammed.

It is apparent that the brushes and wheels 167 and 67, respectively, can be interchanged between the FIGS. 3 and 9 embodiments, and that other forms of clearance means could be employed to sweep excess seeds away from the seed cell inlets.

While several specific embodiments of the invention have been illustrated and described in the foregoing specification, various equivalents and alterations in the construction and arrangement of parts will be apparent to those skilled in the art without departing from the scope and spirit of the invention.

What is claimed is:

1. A planter comprising a supporting frame; a seed container mounted on the frame; a metering member mounted on the frame and having at least one seed carrying element cyclically movable along a first fixed circular path past a seed release point for successively picking up seeds along said fixed path and transporting the seeds individually to the release point; an accelerator member rotatably mounted on the frame operable to carry seeds from an at-rest position within the container to a second concentric circular fixed path continuous with said first fixed path, and thereafter carry the seeds cyclically around said second fixed path in the same direction as that of the seed carrying element at a speed relative to the speed of the seed carrying element such that the seed carrying element is in parallel relationship with a seed during each revolution of the seed carrying element, for receiving a seed which is centrifugally urged into the seed carrying element by the rotating accelerator.

2. A planter as defined in claim 1 wherein said accelerator member includes: an inlet opening communicating with the seed container near the axis of rotation of the accelerator member; an open-sided chamber spaced radially from and communicating with said inlet opening with said open-sided chamber rotating about the axis of the accelerator along said second fixed path, said open-sided chamber being closed by said metering member and said seed carrying element passing the open side of said chamber to receive a seed as said seed carrying element moves about said first fixed path.

3. A precision planter comprising: a seed container; a metering member including an annular seed plate; an accelerator member concentrically received within said seed plate for rotation with respect to said seed plate and said seed container; said accelerator including at least one chamber communicating with the interior of the seed container and having one wall defined by the inner wall of said annular seed plate; at least one radial aperture formed in said annular seed plate to define a seed cell; a fixed retaining member enclosing said annular seed plate and having a peripheral seed release opening formed therein; means for rotating the accelerator about the axis of the seed plate to centrifugally transfer seeds within the container to said chamber and thereafter rotate the seeds within the chamber around said axis with the seeds confined within the chamber by said seed plate; and means for rotating said seed plate about said axis in the same direction as the accelerator but at a different speed such that said seed cell communicates with said chamber at least once during each revolution of the seed plate to centrifugally receive a seed from said chamber and carry it to said release opening and eject the seed centrifugally through said release opening.

4. A precision planter as defined in claim 3 wherein said metering member includes a circular disc supporting said annular seed plate and wherein said accelerator includes a radial flange spaced axially from said circular disc; said one chamber being defined by said circular disc, annular seed plate and radial flange; and further including clearance means supported in said radial flange within said chamber for moving the seeds around the accelerator axis, said clearance means being disposed adjacent the inner periphery of said annular seed plate to remove excess seeds from said seed cell with a wiping action.

5. A precision planter as defined in claim 4 further including an entrance recess formed in the inner periphery of said seed plate surrounding said seed cell, and wherein clearance means comprises a plurality of circumferentially spaced brushes carried by said accelerator flange for wiping seeds out of said entrance recess as the brush moves past the seed cell.

6. A precision planter as defined in claim 3 wherein said accelerator has a greater angular velocity than said seed plate, and said chamber has leading and trailing edges between which the seeds are confined as they are rotated about the accelerator axis.

7. A precision planter as defined in claim 6 further including clearance means mounted on said accelerator within said chamber adjacent the trailing edge thereof, said clearance means having a portion extending toward the inner periphery of the seed plate to sweep excess seeds from around said seed cell as the trailing edge of said chamber moves past the seed cell.

8. A precision planter as defined in claim 7 further including an entrance recess formed in the inner periphery of the seed plate and surrounding the seed cell inlet for guiding seeds into the seed cell, and wherein said clearance means comprises a wheel mounted within said chamber for rotation about an axis parallel to the axis of the accelerator and seed plate, and means for rotating said wheel about its axis in the same direction as that of the accelerator about its axis to deflect seeds from the entrance recess away from the seed cell inlet to permit one seed only to enter the seed cell.

9. A planter comprising: a seed hopper; an accelerator member rotatably mounted on the hopper and having an inlet opening communicating with the hopper outlet; at least one chamber formed in the accelerator member at a location spaced radially outward from the inlet opening of the accelerator and having an opening in the periphery of the accelerator; a passage connecting said chamber with said inlet opening; a rotatable annular seed plate concentrically enclosing said accelerator member with its inner wall overlying the opening in said chamber; at least one opening defining a seed cell in said seed plate having its inlet end in the inner wall of the seed plate; an entrance recess formed in the inner wall of the seed plate surrounding the inlet of the seed cell; a retaining member overlying the path of movement of the seed cell outlet; a seed release opening in the retaining member; means for rotating the accelerator member and seed plate in the same direction but at different angular velocities such that the accelerator moves the seeds centrifugally from an at rest position in the hopper outlet to said chamber and the inlet of the seed cell communicates with the chamber during each revolution to centrifugally receive a seed therefrom; and clearing means carried by the accelerator member for removing any excess seeds with a wiping action from the entrance recess as the seed cell and chambers move out of communication with each other; said seed cell thereafter carrying the seed to the seed release opening where the seed is ejected centrifugally from the seed cell outlet through the seed release opening.

10. A planter as defined in claim 9 further including a recess formed in the periphery of the accelerator and communicating with said chamber; and wherein said clearing means comprises a wheel mounted in said recess for rotation about an axis parallel to the axis of the accelerator with its periphery extending into close proximity with the inner periphery of the seed plate; and means for rotating said wheel to deflect excess seeds from said entrance recess into said chamber as said chamber and wheel moves past the seed cell.

11. A planter as defined in claim 9 wherein said chamber is annular and extends concentrically around the periphery of the accelerator and is enclosed at its periphery by the annular seed plate; and wherein said clearing means includes at least one brush supported on said accelerator within said chamber and projecting into close proximity with the inner periphery of the seed plate for removing excess seeds from said entrance recess.

12. A planter comprising: a supporting frame; a seed container mounted on the frame having a depending outlet; a fitting carried by said depending outlet having an internal cavity communicating with the depending outlet; a seed dispensing assembly mounted on said fitting including: a housing having a cylindrical wall with a horizontal axis; an accelerator member concentrically received in said housing having a hollow shaft rotatably mounted in said fitting about said horizontal axis; said accelerator having an anular inlet opening surrounding said shaft and at least one chamber spaced radially from and communicating with said inlet opening and having an opening in its peripheral wall opposite the inlet opening; a metering member having a shaft journalled in the hollow accelerator shaft for rotation relative thereto; said metering member including an annular seed plate concentrically enclosing said accelerator and overlying the peripheral opening in the wall of the accelerator chamber; at least one seed cell in the form of a radial aperture in said seed plate; an annular spacer ring mounted in the cylindrical wall of said container and enclosing the path of rotation of said seed cell; a seed release opening at the lowermost point on the periphery of said spacer ring; and means for rotating said accelerator and seed plate in the same direction but at different angular velocities relative to each other such that said seed cell communicates with the opening in said chamber during each revolution of the seed plate to centrifugally receive a seed therefrom and carry the seed to said seed release opening where it is centrifugally ejected from the dispensing assembly.

13. A planter comprising: a supporting frame; a seed container mounted on the frame having a depending outlet; a fitting carried by said depending outlet having an internal cavity communicating with the depending outlet; a seed dispensing assembly mounted on said fitting including: a housing having a cylindrical wall with a horizontal axis; an accelerator member concentrically received in said housing having a hollow shaft rotatably mounted in said fitting about said horizontal axis; said accelerator having an annular inlet opening surrounding said shaft and a plurality of peripheral chambers spaced radially from and communicating with said inlet opening and each having an opening in its peripheral wall opposite the inlet opening; a metering member having a shaft journalled in the hollow accelerator shaft for rotation relative thereto; said metering member including an annular seed plate concentrically enclosing said accelerator and overlying the peripheral opening in the wall of the accelerator chamber; a set of angularly spaced seed cells in the form of radial apertures in said seed plate of a size to receive individual seeds of a particular size; an annular spacer ring mounted in the cylindrical wall of said container and enclosing the path of rotation of said seed cells; a seed release opening at the lowermost point on the periphery of said spacer ring; and means for rotating said accelerator and seed plate in the same direction but at different angular velocities relative to each other such that said seed cells communicate with the openings of said chambers during each revolution of the seed plate to centrifugally receive a seed and carry the seed to said release opening where it is centrifugally ejected from the dispensing assembly.

14. A planter as defined in claim 13 further including a plate having one end mounted on the periphery of the cylindrical wall of the housing on one side of said seed release opening and extending in a downwardly inclined plane across said sed release opening; a bracket having a depending wall mounted on the other side of said seed release opening; a hinge member pivotally mounted on the other end of said inclined plate for movement between a closed position engaging said depending leg to form a trough for receiving seeds from said seed release opening, and an open position spaced from said depending leg to release seeds from said trough; means biasing the hinge member to its closed position; and means on said seed plate engageable with the hinge member to actuate the hinge member to its open position after each revolution of the seed plate to permit seeds to accumulate in said trough in accordance with the number of seed cells.

15. A planter as defined in claim 13 further including a second set of seed cells in said seed plate of different size from that of the first set of seed cells spaced axially from said first set of seed cells; means on said accelerator shutting off communication between said chambers and said second set of seed cells, and said seed plate being selectively reversible on said metering member to place the second set of seed cells in communication with said chambers with the first set of seed cells shut off from communication with said chambers.

16. A planter as defined in claim 13 further including a second set of seed cells in said seed plate spaced axially from said first set of seed cells and in side-by-side relationship therewith such that a pair of seed cells simultaneously communicate with said chambers and pass said seed release opening at selected intervals to eject seeds in pairs from the assembly.

17. A planter as defined in claim 16 further including a recess formed in the periphery of said accelerator member adjacent to and communicating with each of said chambers; a clearance wheel received in each of said recesses and extending across the path of said pairs of seed cells; and means for rotating said clearance wheels about an axis parallel with the axes of the accelerator and metering members for deflecting excess seeds away from said pairs of seed cells as the cells move out of communication with the chambers.

18. A seed dispensing assembly comprising a housing having a cylindrical wall with a seed release opening therein; an annular seed plate rotatably mounted in said housing concentrically with said cylindrical wall; an opening in said housing for communication with a seed supply; means operable to transfer seeds from said opening to the inner periphery of said annular seed plate and rotate the seeds around said inner periphery in the same direction as and at a greater angular velocity than the seed plate; and at least one radial opening through said seed plate defining a seed cell operable to pick up a seed due to the centrifugal force acting on the seeds and carry the seed to said release opening where it may be centrifugally ejected from the assembly through said release opening.

19. A seed dispensing assembly as defined in claim 18 further including an entrance recess formed in the inner periphery of the annular seed plate and at least partially surrounding the inlet of the seed cell for guiding seeds toward the seed cell inlet; and clearance means rotatably about the seed plate axis operable to deflect excess seeds from said entrance recess after a seed is received in the seed cell.

20. A planter comprising means defining a seed release point, at least one seed carrying element movable in a circular path past the seed release point, seed supply means, means for centrifugally moving seeds from the supply to a seed path concentric with the path of the seed carrying element and thereafter move the seeds around said seed path, and means for driving the seed carrying element around its path in the same direction as that of seeds around the seed path at a speed relative to the seeds such that seeds are centrifugally urged into the seed carrying element with a minimum amount of impact force for transport to the seed release point.

References Cited

UNITED STATES PATENTS

| | | | |
|---|---|---|---|
| 792,918 | 6/1905 | Ohlendorf et al. | 221—265 X |
| 2,801,025 | 7/1957 | Cookson et al. | 221—265 X |
| 2,874,878 | 2/1959 | Stokland | 111—77 X |
| 2,949,997 | 8/1960 | Martell | 221—265 X |

FOREIGN PATENTS 1,150,291  8/1957  France.

WALTER SOBIN, *Primary Examiner.*